US007159091B1

(12) United States Patent
Hatalkar et al.

(10) Patent No.: US 7,159,091 B1
(45) Date of Patent: Jan. 2, 2007

(54) DYNAMIC RELOCATION OF EXECUTE IN PLACE APPLICATIONS

(75) Inventors: Atul N. Hatalkar, Chandler, AZ (US); Jeremy P. Duke, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 442 days.

(21) Appl. No.: 10/749,466

(22) Filed: Dec. 31, 2003

(51) Int. Cl.
*G06F 12/02* (2006.01)
(52) U.S. Cl. ...................................... 711/165; 711/103
(58) Field of Classification Search ................. 711/165
See application file for complete search history.

(56) References Cited

U.S. PATENT DOCUMENTS

| 5,754,817 | A  | * | 5/1998 | Wells et al. ................. 711/203 |
| 6,574,747 | B1 | * | 6/2003 | Ginsberg ....................... 714/8 |
| 7,055,145 | B1 | * | 5/2006 | Hatalkar ..................... 717/154 |
| 2004/0088701 | A1 | * | 5/2004 | Hatalkar ..................... 718/100 |

* cited by examiner

*Primary Examiner*—Pierre Bataille
*Assistant Examiner*—Shane M. Thomas
(74) *Attorney, Agent, or Firm*—Troutman Sanders LLP; Jeffrey L. Waters (57) ABSTRACT

Briefly, in accordance with one embodiment of the invention, applications may be dynamically relocated from one flash memory device to another flash memory device based on application usage data. Monitoring of application usage may be continuous, and the application usage data may be updated as application usage changes over time.

29 Claims, 7 Drawing Sheets

DYNAMIC RELOCATION OF EXECUTE IN PLACE APPLICATIONS

BACKGROUND

In many computing systems, for reasons of speed and memory conservation, software modules are executed "in place." This technology is generally known as XIP—eXecute In Place. Most types of embedded devices, such as many handheld computing devices, do not have secondary storage such as a hard disk. Therefore, software modules may be stored in non-volatile memory, such as read-only memory (ROM) or flash memory. In classical non-XIP enabled environments, a software module is relocated from its storage location and decompressed into the system's random-access memory (RAM) before execution begins. In XIP-enabled environments, software modules may be executed directly from where they are stored without incurring these relocation/decompression penalties if certain conditions are met. Thus, executing a software module in XIP mode may lead to faster start-times when launching the module as well as decreasing the need for RAM space.

Some devices, such as Intel® Personal Client Architecture (Intel® PCA) based devices, might have two types of flash memory devices: an "internal flash memory" and an "external flash memory." "Internal flash memory" is a type of non-volatile memory having superior performance characteristics. Internal flash memory is typically located in close proximity to a processor, such as a microprocessor, and may be embedded with the processor. "External flash memory" is a type of non-volatile memory having performance characteristics which are less favorable than internal flash memory. External flash memory is typically located farther away from the processor than the internal flash memory and is typically accessed via a memory bus.

The read and write latencies associated with internal flash memory are much shorter than the corresponding latencies associated with external flash memory. Consequently, XIP applications located in internal flash memory launch and execute much faster than XIP applications located in external flash memory.

Because internal flash memory tends to be much more expensive than external flash memory, however, a device typically has little internal flash memory available in comparison to the availability of cheaper external flash memory. Thus, only a portion of a device's XIP software modules may be stored in internal flash memory, with the majority of XIP software modules being located in slower external flash memory.

Maintaining "frequently used" XIP modules in the faster internal flash memory while locating a user's less frequently used XIP modules in the slower external memory may lead to a better user experience. Currently, however, the decision of where to locate XIP software modules is made at the time the modules are developed, without knowledge of a user's actual usage. Once the modules are built and deployed they maintain their residence in either internal or external flash memory and cannot be moved from one memory to the other. Thus, the XIP applications are assigned between internal flash memory and external flash memory based upon predicted usage of a typical user, not an individual user's actual usage. Because the set of "frequently used" applications varies from user to user and a particular user's usage-pattern tends to change over time, the location of XIP applications are not optimized for a particular user.

DESCRIPTION OF THE DRAWINGS

The subject matter regarded as the invention is particularly pointed out and distinctly claimed in the concluding portion of the specification. The invention, however, both as to organization and method of operation may best be understood by reference to the following detailed description when read with the accompanying drawings in which:

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows may be presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As apparent from the following discussions, it is appreciated that throughout the specification discussions utilizing terms such as "processing," "computing," "calculating," "determining," or the like, may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. These apparatuses may be specially constructed for the desired purposes, or may comprise a general purpose computing device selectively activated or reconfigured by a program stored in the device. Such a program may be stored on a storage medium, such as, but not limited to, any type of disk including floppy disks, optical disks, CD-ROMs, magnetic-optical disks, ROMs, RAMs, electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDAs) and the like.

Types of cellular radiotelephone communication systems intended to be within the scope of the present invention include, although not limited to, Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like.

Reference in the specification to "one embodiment" or "an embodiment" means that a particular feature, structure, or characteristic described in connection with an embodiment is included in at least one embodiment of the invention. The appearance of the phrase "in one embodiment" in various places in the specification are not all necessarily referring to the same embodiment. The term "application" is used throughout the specification and is not meant to be limited to "applications" in a strict sense but encompasses all types of software modules, including but not limited to, dynamic or shared libraries, executables, and configuration or data modules.

Figure 1:
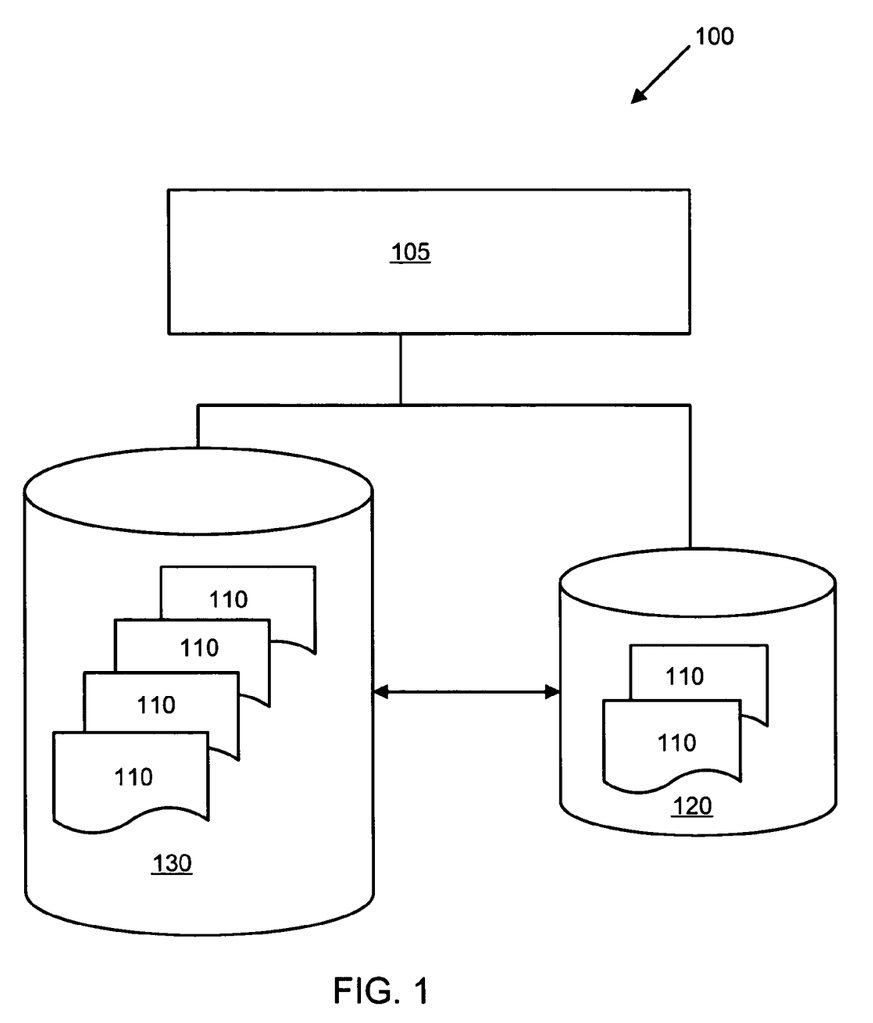
FIG. 1 shows a block diagram of an embodiment of the present invention.

FIG. 1 shows an embodiment of a system 100 in which an XIP Application Manager 105 may relocate XIP applications 110 between internal flash memory 120 and external flash memory 130. The XIP Application Manager 105 may be implemented as part of an operating system (OS) and may use the system registry of the OS for data and storage needs. At any time, there may be one or more XIP applications 110 executing from the internal flash memory 120 and one or more XIP applications 110 executing from the external flash memory 130. The XIP Application Manager 105 may track the usage of the XIP applications and collect XIP usage data. The XIP Application Manager 105 may analyze this XIP usage data to determine a desired location of the XIP applications 110 within the internal flash memory 120 and the external flash memory 130, and relocate the XIP applications 110 in the internal flash memory 120 and the external flash memory 130 in accordance with the desired locations.

Figure 2:
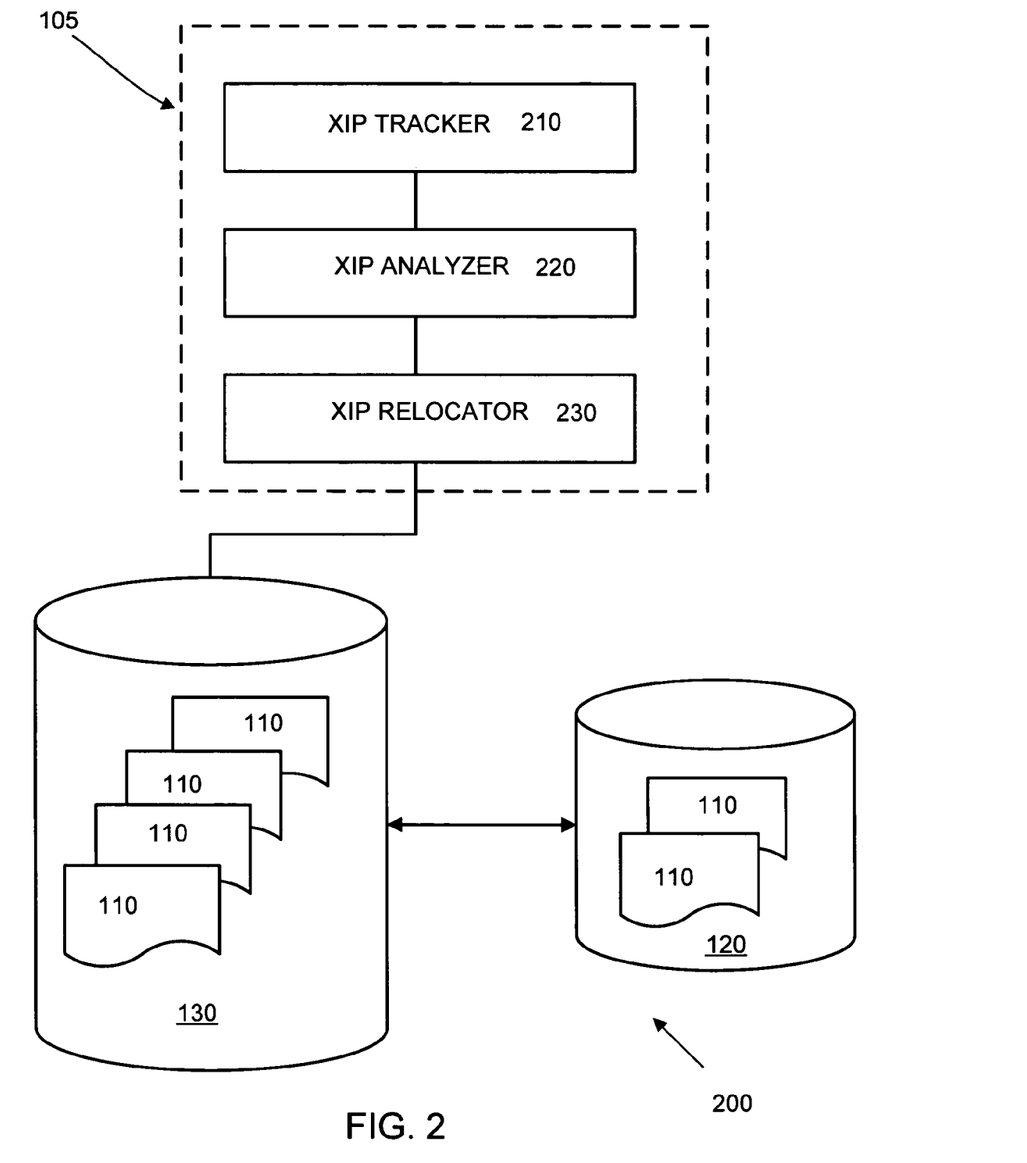
FIG. 2 shows a block diagram of an embodiment of the present invention.

FIG. 2 shows an embodiment 200 in which the XIP Application Manager 105 may be implemented by three primary modules: an XIP tracker 210, an XIP analyzer 220, and an XIP relocator 230. It should be noted that the modules shown in the drawing figures throughout the specification may be in one embodiment of the invention software modules capable of adapting a processor to execute one or more of the functions associated with the modules. In such an embodiment, the modules may adapt a general purpose processor to be a specific and tangible structure capable of executing one or more functions of the module, although the scope of the invention is not limited in this respect.

XIP Tracker 210 may track usage of the XIP Applications 110 stored in internal flash memory 120 and external flash memory 130 and collect XIP usage data. The XIP analyzer 220 may analyze the XIP usage data in accordance with predetermined criteria to determine a desired location of the XIP applications 110 within the internal flash memory 120 and the external flash memory 130. The XIP relocator 230 may relocate the XIP applications 110 between the internal 120 and external 130 flash memories in accordance with the desired locations.

Figure 3:
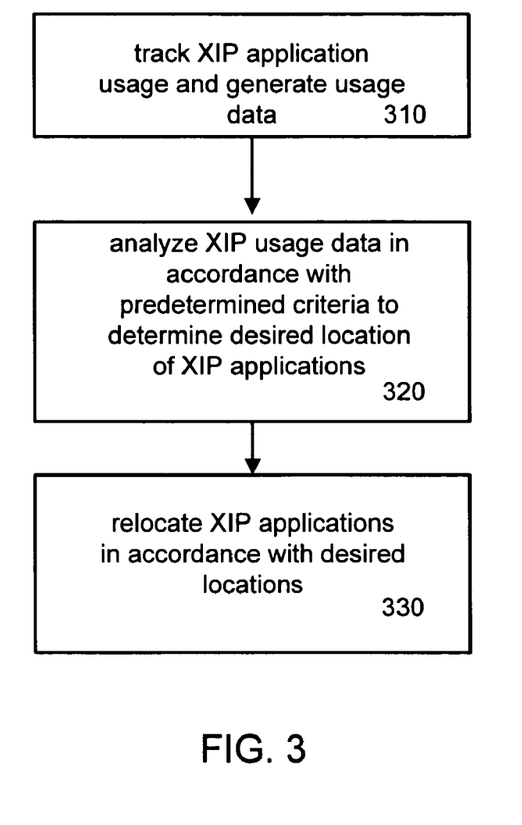
FIG. 3 shows a flow diagram illustrating a possible mode of operation of an embodiment of the present invention.

The apparatus of FIG. 2 may be further understood by reference to FIG. 3 which shows a flow diagram illustrating a possible mode of operation of an embodiment of the present invention. The process of FIG. 3 begins at block 310 with the tracking of XIP applications 110 in the internal 120 and external 130 flash memory to collect XIP usage data. The XIP usage data may then be analyzed in accordance with predetermined criteria to determine a desired location of the XIP applications 110 between the internal flash memory 120 and the external flash memory 130 in block 320. At block 330, the XIP applications 110 may be relocated between the internal flash memory and the external flash memory in accordance with the desired locations.

Figure 4:
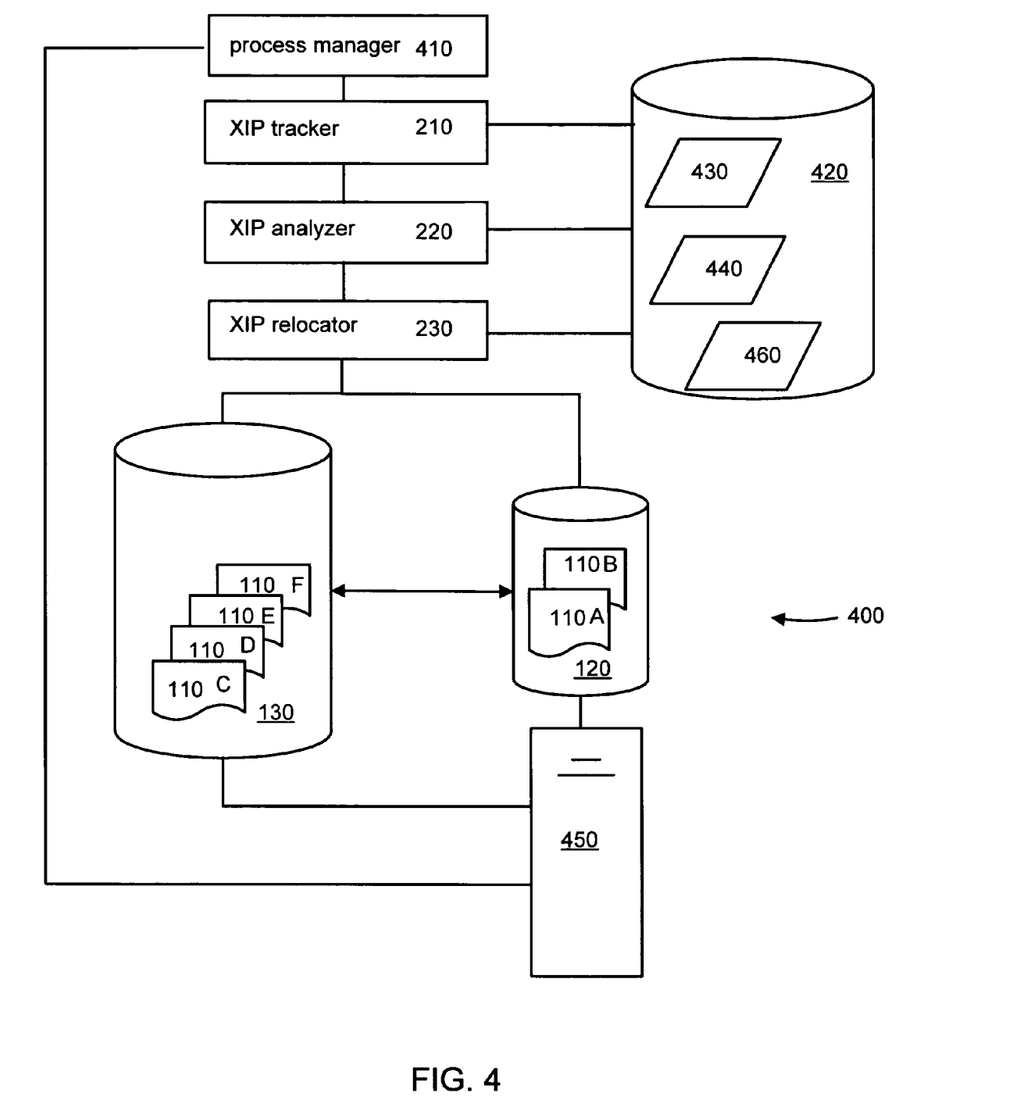
FIG. 4 shows a block diagram of an embodiment of the present invention.

Turning to FIG. 4, a block diagram of an example device 400 capable of managing XIP applications in accordance with an embodiment of the present invention is shown having XIP software modules 110 located in internal flash memory 120 and external flash memory 130. In the example shown in FIG. 4, XIP applications A and B are currently located in internal flash memory 120, and XIP applications C, D, E, and F are currently located in external flash memory 130. The device 400 includes XIP Tracker 210 coupled to a Process Manager module 410 of an OS and may track information about the XIP applications 110 located in the internal flash memory 120 and external flash memory 130, such as when an XIP application 110 is started, used and stopped by a user. The XIP usage data may be compiled and stored in storage. The XIP Tracker 210 may gather this information through communication with process manager 410.

The XIP usage data may be stored in an XIP usage table 430 in storage 420 for later use by XIP analyzer 220. For example, when an XIP application 110 is accessed by a user the XIP usage table 430 may be updated to reflect this event. The XIP tracker 210 may thus gather data showing the number of times each XIP application 110 is used. Table 1 shows sample XIP usage data that may be stored in XIP data usage table 430 showing the frequency of usage for software modules A–F for a particular time period.

TABLE 1

XIP Usage Data

| XIP Application | No. of times used |
|---|---|
| A | 5 |
| B | 390 |
| C | 260 |
| D | 9 |
| E | 2 |
| F | 1 |

Although Table 1 shows the frequency of usage of the XIP applications 110, additional information may also be gathered and stored in the XIP usage data table 430, such as information regarding how long a user used an application, when an application was accessed by a user, when an application was closed by a user, etc. Additional usage information will become apparent to one of skill in the art. Other additional information, not directly related to usage may also be stored in the table, such as the size of the XIP applications 110. Storage 420 is shown as a separate storage but the storage may be part of an existing storage device and the usage data table 430 may be saved in other storage devices such as the internal flash memory 120 or the external flash memory 130 or with the XIP modules 110 themselves.

Device 400 may include a processor 450 to control the operation of device 400. The processor 450 may be coupled to the internal flash memory 120 and the external flash memory 130 for accessing and running the XIP applications 110. Processor 450 may include a microprocessor or a controller, although the scope of the present invention is not limited in this respect. The internal flash memory 120 may be embedded with processor 450.

XIP Analyzer 220 may be coupled to storage 420 and retrieve, read and analyze the data in the XIP data usage table 430 in accordance with one or more predetermined criteria to determine a desired location of the XIP applications 110 within the internal flash memory 120 and the external flash memory 130. The desired locations of the XIP applications 110 may then be stored in an XIP desired location list 440 which may be stored in storage device 420. The XIP desired location list 440 may be saved in other storage such as internal flash memory 120 or external flash memory 130.

In one embodiment, the XIP Analyzer 220 may determine the desired location of the XIP applications 110 based upon frequency of use. Various other criteria may be taken into account by the XIP Analyzer 220 such as the size of the XIP applications 110, the size of the internal flash memory 120, etc. In addition, particular XIP applications 110 may be designated as having permanent locations and will not be relocated. Thus, the XIP Analyzer 220 may employ various heuristics in determining the desired locations of the XIP applications 110. The criteria used by the XIP Analyzer 220 may be changed or updated so that a desired location may change depending upon the particular criteria used. The XIP usage table 430 may be updated continuously as events occur or updated at predetermined intervals, such as once a week.

The XIP analyzer 220 may perform its analysis at the end of a predetermined time period, such as one week, or upon some non-temporal trigger, such as when the device reverts to a particular mode, such as idle mode, power on, after the update of the data usage table, etc. The predetermined time period or other trigger, as well as the criteria used by the analyzer in performing its analysis, may be defined and updated by a variety of sources such as the device manufacturer, the user, a service provider coupled to the device, etc.

An example of an XIP desired location table is shown in Table 2. The data in Table 2 is based upon the criteria that the most frequently accessed XIP applications should be located in internal flash memory 120. Other criteria could be used in analyzing the data and result in different desired locations. As shown in Table 2, based upon criteria determining the most frequently used applications, XIP applications B and C have a desired location in internal flash memory 120 because they are the most frequently used XIP applications, and XIP applications A, D, E, and F have a desired location in external flash memory because they were less frequently used.

TABLE 2

Desired Location of XIP applications

| XIP Application | Desired Location |
|---|---|
| A | external flash |
| B | internal flash |
| C | internal flash |
| D | external flash |
| E | external flash |
| F | external flash |

It should be noted that, depending upon the criteria used by the XIP analyzer 220, the XIP desired location list 440 may be a sorted list of the XIP usage data table 430. Although in this example only a single criterion is used, the XIP analyzer 220 may use multiple criteria to determine the desired location for the XIP applications 110, including additional usage criteria such as the duration of use of the XIP applications 110, as well as criteria that are not directly related to usage, such as the size of the XIP applications 110, the size of the internal flash memory 120, and whether a particular XIP application 110 has been assigned a permanent location.

An XIP current location table 460 identifying the current location of the XIP applications 110, may also be stored in storage device 420. Although shown as stored in storage device 420, the XIP current location table 460 may be saved elsewhere such as in the internal flash memory 120 or the external flash memory 130.

Table 3 shows a sample XIP current location table 460 for the XIP applications 110 shown in FIG. 4, showing XIP applications A and B located in internal flash memory 120 and XIP applications C–F located in external flash memory 130. The XIP current location table 460 may be updated by the XIP relocator 230 after the XIP applications 110 are relocated to their desired locations.

TABLE 3

Current Location of XIP Applications

| XIP Application | Current Location |
|---|---|
| A | internal flash |
| B | internal flash |
| C | external flash |
| D | external flash |
| E | external flash |
| F | external flash |

The XIP relocator 230 may retrieve the XIP current location table 460 and the desired XIP location list 440 from storage 420 and compare the current locations of the XIP applications 110 with the desired locations of the XIP applications 110. If the XIP applications 110 have desired locations that are the same as their current locations, then no relocation is necessary. If the desired locations are different from the current locations, however, then the XIP relocator 230 may relocate the XIP applications 110 in accordance with the desired locations by moving the XIP applications 110 between the internal flash memory 120 and the external flash memory 130.

In relocating the XIP applications 110 to their desired locations, the XIP relocator 230 may temporarily pause execution of the XIP applications 110 prior to the relocation of the applications. In an exemplary embodiment, the XIP relocator 230 then copies to temporary storage (not shown), such as external RAM, the XIP applications 110 which have a desired location in external flash memory 130 but are currently located in internal flash memory 120. As shown in Tables 2 and 3, this would include XIP application A.

The XIP Relocator 230 may then copy to internal flash memory 120 the XIP applications 110 that have a desired location in internal flash memory 120 that are currently located in external flash memory 130. As shown in Tables 2 and 3, this would include XIP application C. The XIP applications 110 that were copied to temporary storage, application A in this example, may then be copied to the external flash memory 130.

It should be noted that XIP applications 110 that have a current location that is the same as the desired location need not be copied. In this example, XIP application B remains in internal flash memory 120; XIP applications D, E, and F remain in external flash memory 130; XIP application A is moved to external flash memory 130; and application C is moved to internal flash memory 120. The relocation to the desired locations need not be performed in this particular order but may be accomplished by other methods known in the art.

After relocating the XIP applications 110 to their desired locations, the XIP relocator 230 may update the XIP current location table 460 to reflect the new locations of the relocated XIP applications 110. For example, the XIP current location table 460 may be updated to show that application A is now in external flash memory 130 and application C is now in internal flash memory 120. The XIP relocator 230 then allows resumption of the execution of the XIP applications 110.

The relocation of the XIP applications 110 may occur at predetermined time periods or upon some specified condition. For example, the XIP tracker 210 may continue to capture data for a predetermined analysis period and then reset. Furthermore, the predetermined analysis period may be adjustable or configurable by the user. The predetermined analysis period may also be adjusted by an external entity such as a device management server in a wired or wireless networked environment. For example, the XIP applications 110 may be tracked and the XIP usage data updated for a one week period and the XIP applications 110 relocated at the end of the week, the following week starting a new cycle. Likewise, the development and analysis of the usage data and the relocation may occur at predetermined intervals or upon a particular triggering event. For example, the relocation may occur each week or when the device enters a particular mode, such as idle mode, power up mode, or power off mode.

Although in this example all XIP modules 110 are candidates for movement between internal flash memory 120 and external flash memory 130, some software modules may be designated as having a permanent location in a particular flash memory. For sake of simplicity, the figures show a single internal flash memory 120 and a single external flash memory 130, but multiple non-volatile memories may be used. Likewise, although six XIP software modules 110 are shown, many software modules may be used. Furthermore, although in this example during the relocation process some XIP applications 110 may be copied to external RAM for temporary storage, they could be copied to some other memory or moved directly to their new location or temporary storage may not be needed at all. For example, in an embodiment, the XIP relocator 230 may determine whether there is sufficient storage space in external flash memory 130 to swap application locations without the use of temporary storage, and if so, perform the relocation without the use of a temporary storage. The XIP relocator 230 may also determine whether there is sufficient space in the external RAM for storing XIP applications 110 temporarily. Furthermore, various algorithms may be used in the copying of the programs, such as ensuring sufficient space is available in the memory that an XIP module 110 is to be copied to, etc.

Figure 5:
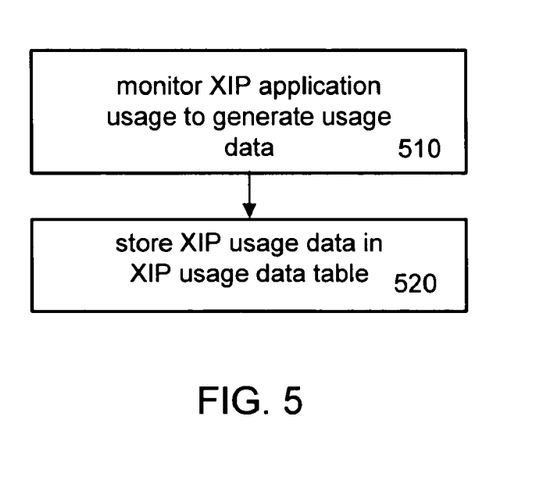
FIG. 5 shows a flow diagram illustrating a possible mode of operation of an embodiment of the present invention.

FIG. 5 shows a flow diagram of a method to generate application usage data in accordance with an embodiment of the present invention. The method may begin at block 510 with the monitoring of XIP applications and the generation of XIP usage data. XIP usage data may be obtained over time and may continuously occur as a user uses device 400. As device 400 is used, a pattern of application usage may be developed. For example, the frequency with which particular applications are opened and used may be obtained. In addition, the amount of time that particular applications are running over a period of time may also be obtained. As XIP usage data is gathered, the application usage data may be stored at block 520, for example in XIP usage table 430 in storage 420.

The analysis method of FIG. 5 may occur periodically, for example once per week, although the scope of the invention is not limited in this respect. The period of configuration analysis may be longer or shorter in duration as desired without departing from the scope of the invention. The frequency with which the relocation is executed may be set by the manufacturer of device 400, by a user, or by a service provider that provides communication services to device 400, although the scope of the invention is not limited in this respect.

Figure 6:
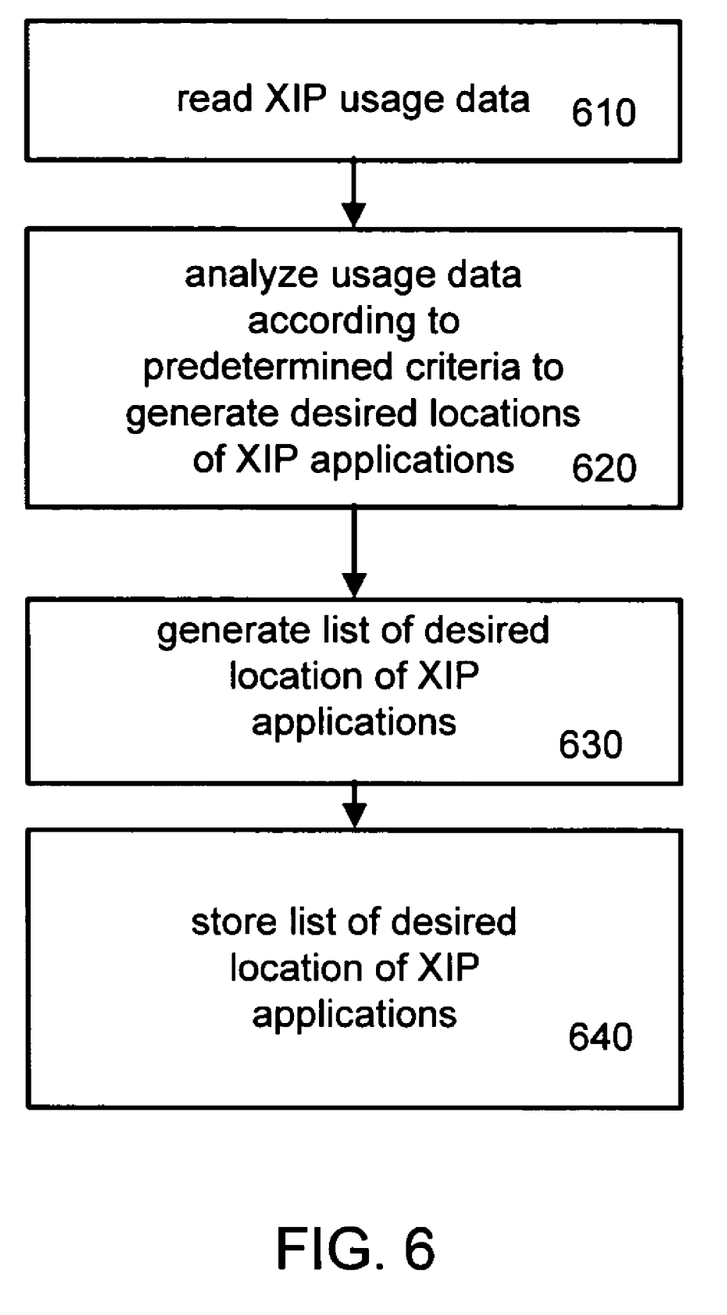
FIG. 6 shows a flow diagram illustrating a possible mode of operation of an embodiment of the present invention.

FIG. 6 shows a flow diagram of a method to determine the desired locations of XIP applications 110 in accordance with an embodiment of the invention. At block 610 XIP usage data may be read from the XIP usage data table 430. At block 620 the XIP usage data may be analyzed in accordance with predetermined criteria to determine desired locations of the XIP applications 110 in internal flash memory 120 and external flash memory 130. In block 630 a XIP desired location list 440 may be created. In block 640 the XIP desired location list 440 may be stored in storage 420.

Figure 7:
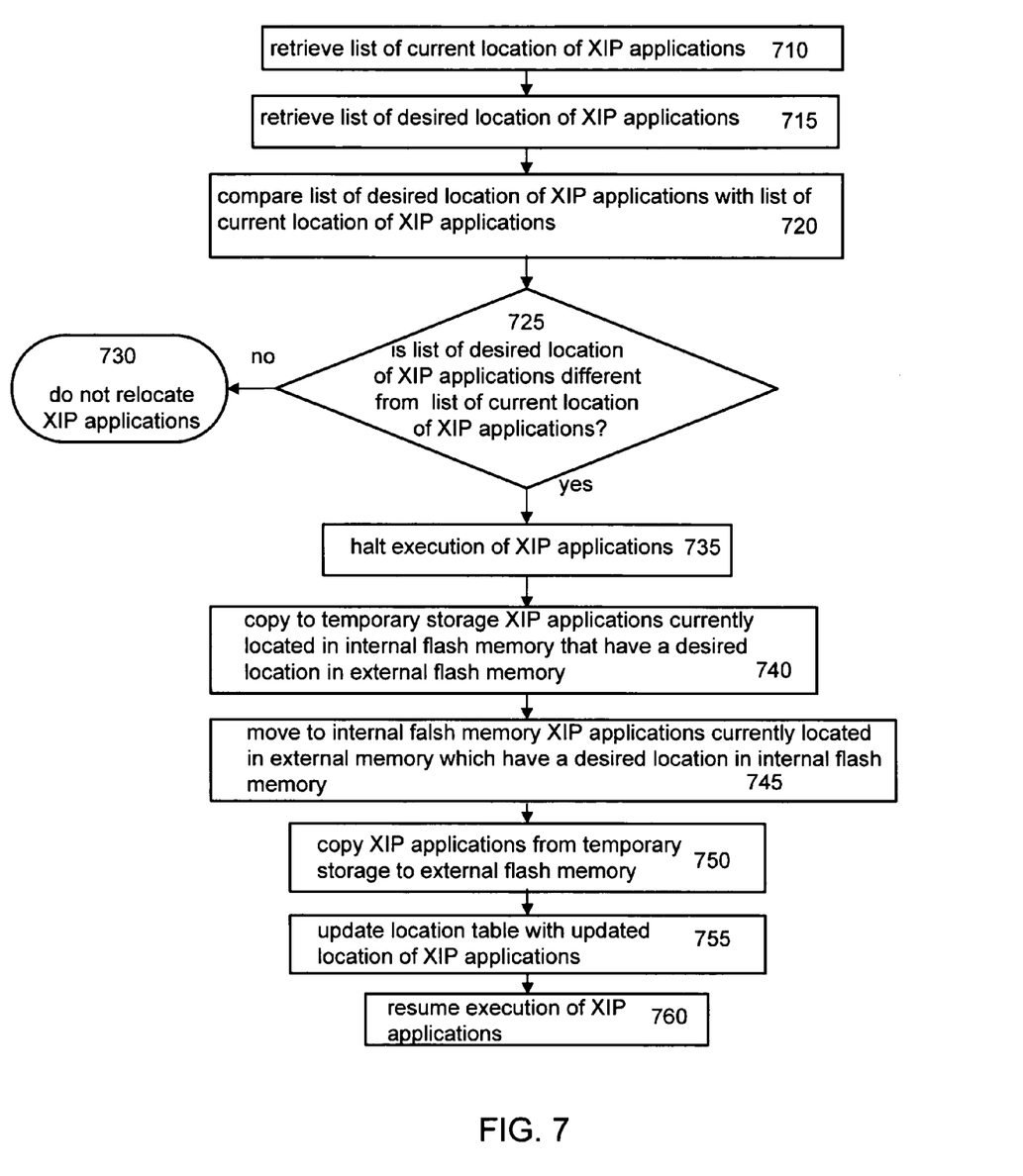
FIG. 7 shows a flow diagram illustrating a possible mode of operation of an embodiment of the present invention.

FIG. 7 shows a flow diagram of a method to move the XIP applications 110 to the determined desired locations. At block 710 an XIP current location table 460 may be retrieved. At block 715 an XIP desired location list 440 may be retrieved. At block 720 the desired locations of the XIP desired location list 440 and the current location of the XIP current location table 460 may be compared to determine if the desired locations are different from the current locations for the XIP applications 110.

At block 725 a determination may be made whether there is a difference between the desired and current locations. If there is no difference, then at block 730 the XIP applications 110 are not relocated and the XIP locations in the XIP current location table 460 are not updated so that the table may be used in a subsequent analysis. If a difference is found between the desired locations and the current locations then the XIP applications 110 may be relocated and the execution of the XIP applications may be paused at block 735.

At block 740 the XIP applications 110 that have a current location in internal flash memory 120 and a desired location in external flash memory 130 may be copied to temporary storage. At block 745 the XIP applications 110 that have a current location in external flash memory 130 and have a desired location in internal flash memory 120 may be moved to internal flash memory 120. At step 750 the XIP applications 110 that were moved from internal flash memory 120 to temporary storage may be copied to external flash memory 130.

At block 755 the XIP current location table 460 may be updated to reflect the new locations of the XIP applications 110. Execution of XIP applications 110 may then resume at block 760.

Figure 8:
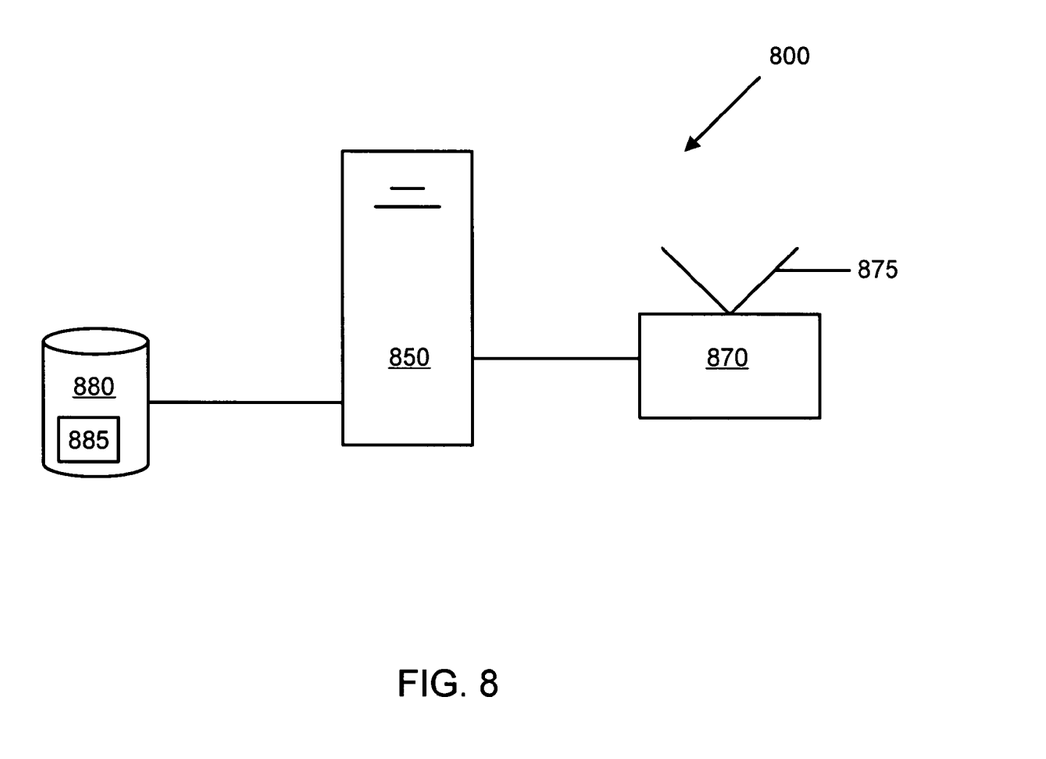
FIG. 8 shows a block diagram of a portable device that may be used to manage XIP applications in accordance with an embodiment of the present invention.

FIG. 8 shows a block diagram of a portable device 800 that may be used to manage XIP applications 110 in accordance with an embodiment of the present invention. Device 800 may include a transceiver 870, and optionally include one or more antennas 875 that may couple with processor 850 so that device 800 may communicate with other devices such as a base station, an access point, etc., via a wireless communication link, although the scope of the invention is not limited in this respect. Multiple antennas 875 may be used, for example, to provide multiple channels or modes of communication, or may be used to help identify device 800 from other devices.

In one embodiment of the invention, although not necessarily all, a storage device 880 may couple to processor 850 to store an application 885, and also data or other information. Storage device 880 may include a memory device such as semiconductor memory, for example non-volatile memory such as read-only memory ROM or flash memory, a disk drive, a removable storage medium, or the like, although the scope of the invention is not limited in this respect. In one embodiment, an application, a command, or data may be received from a base station via at least one or more communication links. In one embodiment, an application 885 may be a configuration application to configure the operation of device 800. Device 800 may include primary storage, for example non-volatile memory such as flash and application 880 may be stored in primary storage to be executed by processor 850.

In one embodiment, the configuration information may define one or more operating characteristics of device 800, and may include at least a portion of an operating system, protocol stack, or standard application layer. In one embodiment, the configuration information may be a software upgrade that defines one or more features of the portable device. The configuration information may be, for example, retrieved from a database of a remote device or system coupled to device 800 via a base station. In an embodiment, application 885 may be an application for establishing communications via an ad-hoc network in accordance with an embodiment of the present invention, although the invention is not limited in this respect.

In one embodiment, device 800 may be transportable by a user, such as a hand held device, and may be operated by a user while being hand held or otherwise on the person of the user, such as in a pocket, attached to a belt or holster, and so on. A base station may allow device 800 to communicate with other devices, and may allow device 800 to communicate via a network. In one embodiment, a network may be a wide area network or worldwide network such as the Internet, although the scope of the present invention is not limited in this respect. As a transportable device, device 800 may be referred to as mobile units (MUs).

In one embodiment, device 800 may be battery operated where the battery serves as a power source during operation, and may alternatively be powered from an external power source such as an ac or dc power source, directly, to charge the battery, or to provide supplemental power to the device, although the scope of the present invention is not limited in this respect. In one embodiment of the invention, device 800 may be configured to operate via a wireless or a cellular network compliant with at least one or more cellular standards, including but not limited to 3rd Generation Partnership Project (3GPP), WCDMA, CDMA 2000, Global System for Mobile Communications-General Packet Radio Service (GSM-GPRS), Global System for Mobile Communications-Enhanced General Packet Radio Service (GSM-EGPRS), Institute of Electrical and Electronics Engineers (IEEE) Standards 802.11a, 802.11b, and so on, although the scope of the present invention is not limited in this respect. Other wireless standards may be utilized without departing from the scope of the invention and without providing substantial change thereto.

In one embodiment of the invention, application 885 may include XIP applications 110, process manager 410, XIP tracker 210, XIP analyzer 220, and XIP relocator 230. Storage device 880 or primary storage 420 may include XIP usage data table 430, XIP desired location list 440 and XIP current location table 460. Furthermore, XIP applications 110, process manager 410, XIP tracker 210, XIP analyzer 220, and XIP relocator 230 may be executed by processor 850, along with the operating system of device 800.

Although the invention has been described with a certain degree of particularity, it should be recognized that elements thereof may be altered by persons skilled in the art without departing from the spirit and scope of the invention. It is believed that dynamic management of execute-in-place applications of the present invention and many of its attendant advantages will be understood by the forgoing description, and it will be apparent that various changes may be made in the form, construction and configuration of the components thereof without departing from the scope and spirit of the invention or without sacrificing all of its material advantages, the form herein before described being merely an explanatory embodiment thereof, and further without providing substantial change thereto. It is the intention of the claims to encompass and include such changes.

What is claimed is:

1. An apparatus, comprising:
   an XIP tracker to track usage of XIP applications executing from one of at least two memory devices and generate XIP usage data;
   an XIP analyzer to analyze the XIP usage data in accordance with at least one predetermined criteria and determine a desired location of said XIP applications; and
   an XIP application relocator to relocate the XIP applications between the at least two memory devices in accordance with the desired location.

2. The apparatus of claim 1, wherein said at least two memory devices comprises an internal flash memory device and an external flash memory device.

3. The apparatus of claim 1, wherein said XIP tracker monitors the usage of the XIP applications in the one of the at least two memory devices to generate the XIP usage data and stores the XIP usage data in an XIP usage table.

4. The apparatus of claim 3, wherein said XIP usage table is stored in one of the at least two memory devices.

5. The apparatus of claim 1, wherein the XIP tracker is adapted to update the XIP usage data as the XIP applications are used.

6. The apparatus of claim 2, wherein the XIP analyzer generates a list of desired locations of said XIP applications.

7. The apparatus of claim 6, wherein the XIP analyzer orders the XIP usage data table in accordance with the predetermined criteria to form the list of the desired locations of the XIP applications.

8. The apparatus of claim 7, wherein said list comprises XIP applications having a desired location in the internal flash memory device.

9. The apparatus of claim 8, wherein said list is stored in the external flash memory device.

10. The apparatus of claim 1, wherein said predetermined criteria comprises at least two of the following:
    frequency of usage of the XIP applications;
    size of the XIP applications; and
    duration of usage of the XIP applications.

11. The apparatus of claim 1, wherein said predetermined criteria is updateable.

12. The apparatus of claim 1, wherein said XIP relocator compares the desired location of the XIP applications to a current location of the XIP applications to determine whether to relocate the XIP applications.

13. The apparatus of claim 1, wherein said XIP relocator updates an XIP location table after relocation of the XIP applications.

14. A method, comprising:
    tracking usage of XIP applications stored in at least two flash memories to generate XIP usage data;
    analyzing the XIP usage data in accordance with at least one predetermined criteria to determine a desired location of said XIP applications; and
    relocating the XIP applications between the at least two flash memories in accordance with desired location.

15. The method of claim 14 wherein said tracking usage of XIP applications stored in the at least two flash memories to generate XIP usage data comprises:
    monitoring usage of the XIP applications stored in flash memories to develop the XIP usage data; and
    storing the XIP usage data in a XIP usage table.

16. The method of claim 14, where said tracking usage of XIP applications stored in the at least two flash memories to generate XIP usage data comprises updating said XIP usage data as usage changes over time.

17. The method of claim 14, wherein said analyzing the XIP application usage data in accordance with at least one predetermined criteria to determine a desired location of said XIP applications comprises generating a list of desired locations for the XIP applications.

18. The method of claim 17, wherein said list of desired locations for the XIP applications comprises a list of XIP applications having a desired location in the internal flash memory device.

19. The method of claim 14, wherein said at least one predetermined criteria comprises frequency of usage of the XIP applications.

20. The method of claim 14, wherein said at least one predetermined criteria comprises the size of the XIP applications.

21. The method of claim 14, further comprising updating said at least one predetermined criteria.

22. The method of claim 14, wherein said relocating the XIP applications between the at least two flash memories in accordance with said desired location, comprises generating a list of current XIP application locations and comparing said list of current XIP application locations with the desired location of the XIP applications to determine whether the XIP applications should be relocated.

23. The method of claim 14, further comprising updating an XIP application location table after the XIP applications are relocated.

24. The method of claim 14, wherein relocating the XIP applications in accordance with said desired location comprises:
    pausing execution of the XIP applications;
    copying XIP applications located in internal flash memory which have been identified as having a desired location in external flash memory from said internal flash memory to a temporary storage;
    moving XIP applications located in external flash memory which have a desired location in internal flash memory from said external flash memory to said internal flash memory; and
    moving the XIP applications in the temporary storage from the temporary storage to said external flash memory.

25. An article, comprising a storage medium, said storage medium having stored thereon instructions, said instructions, when executed to relocate XIP applications in internal flash memory and external flash memory, comprising:
    tracking usage of XIP applications stored in an internal flash memory and an external flash memory to generate XIP usage data;
    analyzing the XIP usage data in accordance with at least one predetermined criteria to determine a desired location of said XIP applications; and
    relocating the XIP applications in the internal flash memory and the external flash memory in accordance with said desired location.

26. The article of claim 25, said instructions further resulting in updating said at least one predetermined criteria.

27. The article of claim 25, said instructions further resulting in generating a list of current XIP application locations and comparing said list of current XIP application locations with the desired location of the XIP applications to determine whether the XIP applications should be relocated.

28. An apparatus comprising:
- a processor;
- an internal flash memory coupled to the processor to store XIP applications;
- an external flash memory coupled to the processor to store XIP applications; and
- an XIP application manager coupled to the internal flash memory and the external flash memory to track usage of XIP applications and relocate the XIP applications in accordance with said usage between the internal flash memory and the external flash memory.

29. The apparatus of claim 28 wherein said XIP application manager comprises:
- an XIP usage tracker to track usage of XIP applications in internal flash memory and external flash memory and to generate XIP usage data;
- an XIP analyzer to analyze the XIP usage data in accordance with at least one predetermined criteria and to determine a desired location of said XIP applications; and
- an XIP application relocator to relocate the XIP applications between the internal flash memory and the external flash memory in accordance with the desired location.

* * * * *